US006980823B2

(12) United States Patent
Challa et al.

(10) Patent No.: US 6,980,823 B2
(45) Date of Patent: Dec. 27, 2005

(54) INTERMEDIATE WAKE MODE TO TRACK SLEEP CLOCK FREQUENCY IN A WIRELESS COMMUNICATION DEVICE

(75) Inventors: Raghu Challa, San Diego, CA (US); Baaziz Achour, San Diego, CA (US); Robbin D. Hughes, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 217 days.

(21) Appl. No.: 10/206,630

(22) Filed: Jul. 26, 2002

(65) Prior Publication Data

US 2003/0144020 A1 Jul. 31, 2003

Related U.S. Application Data

(60) Provisional application No. 60/353,475, filed on Jan. 31, 2002.

(51) Int. Cl.$^7$ .............................................. H04B 7/00
(52) U.S. Cl. ...................... 455/522; 455/574; 455/21
(58) Field of Search .............................. 455/522, 343, 455/574, 550, 572, 506, 69, 502, 67.6, 517, 455/38.3, 21; 370/311

(56) References Cited

U.S. PATENT DOCUMENTS

| | | | | |
|---|---|---|---|---|
| 5,392,287 A | * | 2/1995 | Tiedemann et al. | 370/311 |
| 5,428,820 A | * | 6/1995 | Okada et al. | 340/7.33 |
| 5,826,173 A | * | 10/1998 | Dent | 340/7.38 |
| 5,845,204 A | * | 12/1998 | Chapman et al. | 455/343.1 |
| 5,953,648 A | | 9/1999 | Hutchison et al. | |
| 5,991,635 A | * | 11/1999 | Dent et al. | 455/517 |
| 5,995,820 A | * | 11/1999 | Young et al. | 455/343.1 |
| 6,212,398 B1 | * | 4/2001 | Roberts et al. | 455/502 |
| 6,311,081 B1 | * | 10/2001 | Northcutt et al. | 455/574 |
| 6,330,234 B1 | * | 12/2001 | Tomasi et al. | 370/342 |

(Continued)

FOREIGN PATENT DOCUMENTS

WO 0160103 8/2001

OTHER PUBLICATIONS

Lin et al., "Modeling the Sleep Mode For Cellular Digital Packet Data", IEEE Communications Letters, vol. 3, No. 3, pp. 63-65, Mar. 1999.

(Continued)

*Primary Examiner*—Tilahun Gesesse
*Assistant Examiner*—Tan Trinh
(74) *Attorney, Agent, or Firm*—Philip R. Wadsworth; Charles D. Brown; George C. Pappas

(57) ABSTRACT

Various techniques for improving a wireless communication device are described. The techniques may include reducing power in a wireless communication device for a first sleep period and then increasing power in the wireless communication device for an intermediate wake period after the first sleep period to estimate an error of the sleep clock. The method may further include reducing power in the wireless communication device for a second sleep period after the intermediate wake period. The intermediate wake mode implemented during the intermediate period can be used to estimate the error of the sleep clock without performing one or more tasks associated with an awake mode, such as demodulation. The techniques may facilitate the effective use of low frequency low power clocks for sleep mode, even when relatively large slot cycles are defined within a slotted paging system.

29 Claims, 4 Drawing Sheets

U.S. PATENT DOCUMENTS

| | | | |
|---|---|---|---|
| 6,333,939 B1 | 12/2001 | Butler et al. | 370/503 |
| 6,356,538 B1 * | 3/2002 | Li | 370/311 |
| 6,411,830 B2 * | 6/2002 | Alon et al. | 455/574 |
| 6,437,623 B1 * | 8/2002 | Hsu et al. | 327/202 |
| 6,570,885 B1 * | 5/2003 | Gregg | 370/428 |
| 6,658,240 B1 * | 12/2003 | Ries | 455/183.1 |
| 2002/0146985 A1 * | 10/2002 | Naden | 455/70 |
| 2003/0107475 A1 * | 6/2003 | Bautista et al. | 340/7.35 |

OTHER PUBLICATIONS

Nagata et al., "Control Techniques and Power Saving Effects of Intermittent Operation in Radio Units", Vehicular Technology Conference, Tampa, Jun. 1-3, 1987, pp. 560-566.

* cited by examiner

INTERMEDIATE WAKE MODE TO TRACK SLEEP CLOCK FREQUENCY IN A WIRELESS COMMUNICATION DEVICE

RELATED APPLICATIONS

This application claims the benefit of provisional U.S. Application Ser. No. 60/353,475, entitled "INTERMEDIATE WAKE MODE TO TRACK SLEEP CLOCK FREQUENCY IN A WIRELESS COMMUNICATION DEVICE," filed Jan. 31, 2002, which is incorporated herein by reference in its entirety for all purposes.

This disclosure relates generally to wireless communication devices and, more particularly, to sleep mode operation of a wireless communication device.

BACKGROUND

A number of different wireless communication techniques have been developed, including frequency division multiple access (FDMA), time division multiple access (TDMA) and various spread spectrum techniques. One common spread spectrum technique used in wireless communication is code division multiple access (CDMA) signal modulation in which multiple communications are simultaneously transmitted over a spread spectrum radio-frequency (RF) signal. Some example wireless communication devices that have incorporated one or more wireless communication techniques include cellular radiotelephones, PCMCIA cards incorporated within portable computers, personal digital assistants (PDAs) equipped with wireless communication capabilities, and the like.

Conserving power in a wireless communication device is a paramount concern. To conserve power, the wireless communication device may periodically operate in a low-power mode, often referred to as sleep mode. When operating in sleep mode, the wireless communication device can reduce power consumption by disconnecting power to selected internal components. For example, slotted paging techniques have been developed, in which paging signals are sent from a base station to wireless communication devices within assigned paging slots, separated by predetermined intervals of time. Slotted paging allows a wireless communication device to operate in sleep mode during the period of time between consecutive paging slots without missing paging signals.

A slot cycle refers to the amount of time between successive paging slots to be detected by a particular wireless communication device in a slotted paging system. Slot cycles are typically on the order of 1 to 20 seconds, but may be any length of time. For example, slot cycles for wireless communication devices operating in data transfer mode may be much longer than slot cycles associated with real time radiotelephone calls because the response time of the wireless communication device may not need to be as quick for wireless data transfer.

During the sleep period of the slot cycle, the wireless communication device tracks the amount of elapsed time in order to determine the appropriate time to wake up for reception of paging signals. Thus, even during sleep mode, the wireless communication device consumes some power, i.e., power sufficient to track the amount of elapsed time. The system clock of the wireless communication device is typically a relatively high frequency, high power clock such as a voltage controlled temperature compensated crystal oscillator (VCTCXO). Unfortunately, a VCTCXO or other high frequency, high quality clock may consume excessive amounts of power.

To further reduce power consumption during sleep mode, a wireless communication device may implement a relatively low frequency, low power clock that operates specifically during sleep mode, allowing the high power clock to be powered down along with other internal components of the wireless communication device during the sleep mode. However, low frequency, low power clock signals typically suffer from considerable variation and/or drift, making it more difficult to accurately track the amount of elapsed time during sleep mode.

SUMMARY

In general, this disclosure describes various sleep mode techniques that can be implemented in a wireless communication device. The techniques can reduce power consumption of the wireless communication device by facilitating the use of a relatively low frequency, low power clock during sleep mode. For example, power can be reduced in a wireless communication device for a first sleep period and then increased for an intermediate period after the first sleep period to enable estimation of an error in the sleep clock. Sleep clock error is sometimes referred to as a slew. During the intermediate period, demodulation of paging signals can be avoided to conserve power. After the intermediate period, power can be reduced in the wireless communication device for a second sleep period. After one or more sleep periods and intermediate periods, the wireless communication device can be powered up for full awake mode to detect and demodulate paging signals.

The techniques may be implemented in hardware, software, firmware, or any combination thereof. If implemented in software, the techniques may be directed to a computer readable medium carrying program code, that when executed, performs one or more of the techniques described below. In that case, the techniques may be embodied in computer readable instructions. A memory may store the instructions, and a processor coupled to the memory may execute the instructions to perform one or more of the techniques.

Additional details of these and other embodiments are set forth in the accompanying drawings and the description below. Other features, objects and advantages will become apparent from the description and drawings, and from the claims.

DETAILED DESCRIPTION

Figure 1:
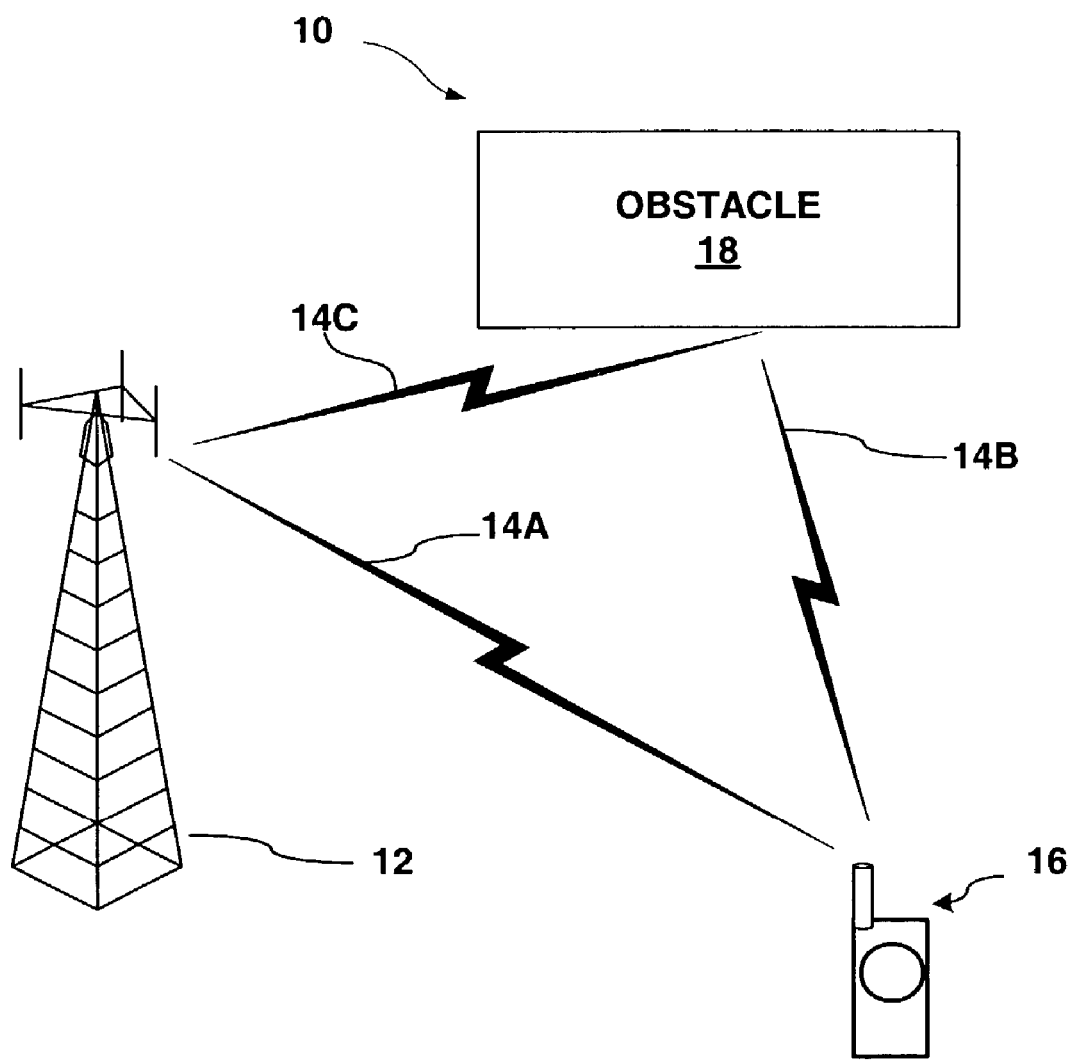
FIG. 1 is a block diagram illustrating a wireless communication system.

FIG. 1 is a block diagram illustrating an exemplary wireless communication system 10. For example, system 10 may be designed to support one or more wireless communication standards such as CDMA, FDMA, TDMA, one or more high speed wireless data standards, or any other wireless communication standard. As shown in FIG. 1, system 10 may include a base station 12 that transmits and receives signals 14 to and from a wireless communication device (WCD)16 via one or more paths. WCD 16 may implement a RAKE receiver to track multi-path signals, e.g., the same signal propagating over different paths and possibly received at different times. For example, WCD may receive signal 14A from base station 12 via a first path, as well as signal 14B via a second path caused by reflection of signal 14C from an obstacle 18. Obstacle 18 may be any structure proximate to subscriber unit 16 such as a building, bridge, car, or even a person.

By way of example, CDMA standards that system 10 may be designed to support may include one or more of the following: (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) the HDR system documented in TIA/EIA-IS-856, "CDMA2000 High Rate Packet Data Air Interface Specification," and (6) some other standards.

In addition, system 10 may be designed to support standards such as the GSM standard or related standards, e.g., the DCS1800 and PCS1900 standards. GSM systems employ a combination of FDMA and TDMA modulation techniques. System 10 may also support other FDMA and TDMA standards. In some embodiments, WCD 16 may be implemented as a hybrid access terminal (HAT) that supports multiple standards. For example, WCD 16 may support the 1x-CDMA2000 standard for voice communications and the IS856 standard for high-speed data communications. The IS856-compliant system can be co-located or overlaid in some other manner with the 1x-CDMA2000 network to provide enhanced high-speed data services.

WCD 16 may take the form of a cellular radiotelephone, a satellite radiotelephone, a PCMCIA card incorporated within a portable computer, a personal digital assistant (PDA) equipped with wireless communication capabilities, or the like. Base station 12 (sometimes referred to as a base transceiver system, or BTS) may include a base station controller (not shown) that provides an interface between base station 12 and a public switched telephone network. System 10 may include any number of WCDs and base stations.

System 10 may implement slotted paging, in which base station 12 sends paging signals to WCD 16 within assigned paging slots separated by predetermined intervals of time. Slotted paging allows WCD 16 to operate in sleep mode during periods of time between consecutive paging slots without missing paging signals. In other words, WCD 16 operates in a sleep mode and periodically wakes up at times corresponding to the time when paging signals are expected. Received paging signals can be demodulated in order to identify whether information or data is to be sent to WCD 16. If so, WCD 16 may remain in awake mode to receive the information. For example, if WCD 16 is a radiotelephone, the paging signal can inform WCD 16 of an incoming call, at which time a wireless link, or the like, can be established to effectuate wireless communication between the caller and a user of WCD 16.

WCD 16 may receive paging signals over a paging channel as outlined above, and may also receive pilot signals over a pilot channel. Pilot signals generally refers to signals comprising a repetitive pseudo-noise (PN) sequence used for various synchronization purposes. In some cases, the pilot signals may be use to estimate an error in the sleep clock of WCD 16. For example, the time that a pilot signal is received may be compared to an expected time in order to define an error in the sleep clock. This estimation of the error in the sleep clock may occur in various modes of operation of WCD 16, including awake mode, and intermediate wake mode as outlined below. In intermediate wake mode, however, various tasks such as demodulation of the paging channel can be avoided specifically to conserve power.

In particular, as described in greater detail below, WCD 16 periodically implements a mode of operation referred to herein as an intermediate wake mode. Intermediate wake mode is a mode of operation of WCD 16 that is different from a normal-awake mode (normal-awake mode is also referred to herein as full-awake mode or simply awake mode). During intermediate wake mode, WCD 16 wakes up long enough and with sufficient power to estimate an error associated with its sleep clock. For example, as mentioned WCD 16 can compare the time that a pilot signal is received with the time it is expected to estimate the error of the sleep clock. However, during intermediate wake mode, WCD does not necessarily perform one or more tasks associated with a normal-awake mode, such as demodulation of the paging signals. Instead, after estimating the error associated with its sleep clock and correcting for the error, WCD 16 returns to low power sleep mode, i.e., a second sleep period.

The ability to periodically operate in an intermediate wake mode can provide a number of advantages to WCD 16. For example, intermediate wake mode consumes significantly less power than normal-awake mode. The reduction in power consumption may be due to one or more of a number of factors. For example, intermediate wake mode may last a shorter amount of time than a normal-awake mode. Moreover, because demodulation is not performed during intermediate wake mode, a demodulator, e.g., including a number of RAKE receiver fingers, may remain without power or in a low power state during the intermediate wake mode. In this manner, power can be conserved during intermediate wake mode.

Intermediate wake mode can also facilitate the use of lower cost sleep clocks, particularly when relatively large slot cycles are defined. A slot cycle refers to the amount of time between successive paging slots to be detected by WCD 16 in a slotted paging system. As the size of a slot cycle is increased, the frequency error of the sleep clock becomes more problematic. In particular, when the slot cycle is large, the frequency error of the sleep clock may cause WCD 16 to wake up at the wrong time, i.e., too early or too late. In either case, WCD 16 may not receive the paging signals, and may need to remain in an awake state for extended time (possibly for the next full slot cycle) to ensure that the next paging signal is received. Extended awake mode can result, however, in inefficient use of power.

The implementation of one or more intermediate wake periods over the course of a slot cycle can ensure that WCD 16 is adequately accounting for the frequency error of its sleep clock, thereby ensuring that WCD 16 will be awake when the paging signal is expected. In this manner, the implementation of intermediate wake mode can facilitate the use of lower cost sleep clocks and the implementation of longer slot cycles.

Figure 2:
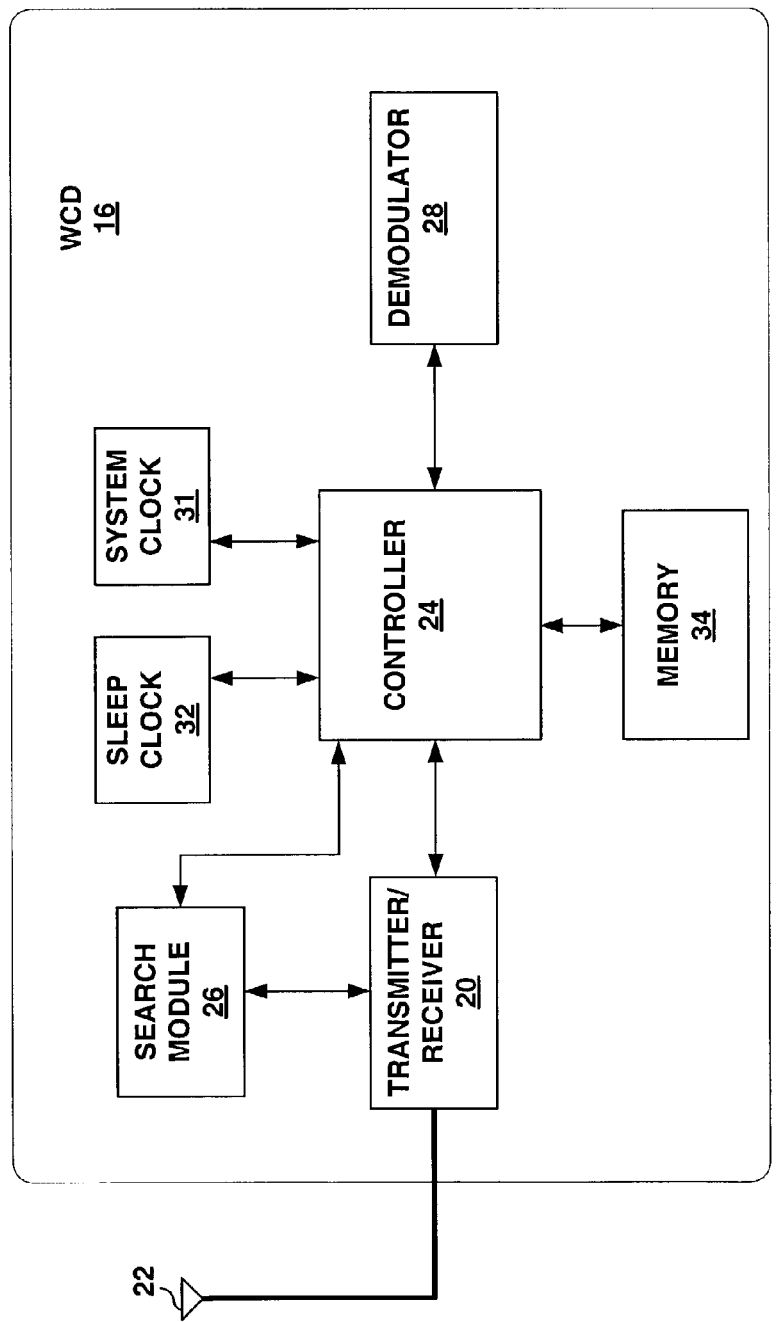
FIG. 2 is a block diagram illustrating an exemplary wireless communication device.

FIG. 2 is an exemplary block diagram of WCD 16 configured to support one or more CDMA standards. As shown, WCD 16 includes a radio frequency transmitter/receiver 20, a radio frequency antenna 22, a controller 24, a search module 26 and a demodulator 28. WCD 16 may also include one or more clocks such as system clock 31 and sleep clock 32. In some cases, a single clock can operate as both system clock 31 and sleep clock 32. However, by implementing a lower power, low frequency sleep clock 32, power can be conserved during sleep mode by powering off the higher frequency system clock 31. By way of example, system clock 31 may comprise a voltage controlled temperature compensated crystal oscillator (VCTCXO) operating at a frequency of approximately 19.68 megahertz, although it is not limited in that respect. Also, by way of example, sleep clock 31 may comprise a low power oscillator operating at a frequency in the range of 30 kilohertz to 60 kilohertz, or 1.92 megahertz to 3.84 megahertz, although it is not limited in those respects.

WCD 16 may also include one or more memory devices 34 for storing computer readable instructions that can be executed by a processor, for example, within controller 24. In that case, the processor may be directly coupled to memory device 34. The functions of demodulator 28, search module 26 and controller 24 may be implemented by one or more digital signal processors (DSP), discrete hardware circuitry, firmware, field programmable gate arrays (FPGA), software executing on a programmable processor such as a DSP, or a combination of any of the above.

During operation in awake mode, antenna 22 receives incoming signals, such as paging signals and pilot signals transmitted from base station 12. Transmitter/receiver 20 includes circuitry to process received signals and output digital values. Transmitter/receiver 20 may process the received signal using a low-noise amplifier (LNA), an RF mixer and an analog-to-digital (A/D) converter (not shown in FIG. 2) to produce corresponding digital values. The digital values may comprise a train of pulses sometimes referred to as "chips."

WCD 16 can use search module 26 to continuously scan an incoming spread spectrum signal in the time domain to determine the existence, time offset, and signal strength of various received paths. Search module 26 records and reports the path information to controller 24 as search results. Local maximum energy peaks, representing received paths, appear for time offsets that result in recovery of a received signal, while other time offsets typically result in little or no signal energy. In a multi-path environment, signal reflections or echoes may cause multiple energy peaks to occur.

Figure 3:
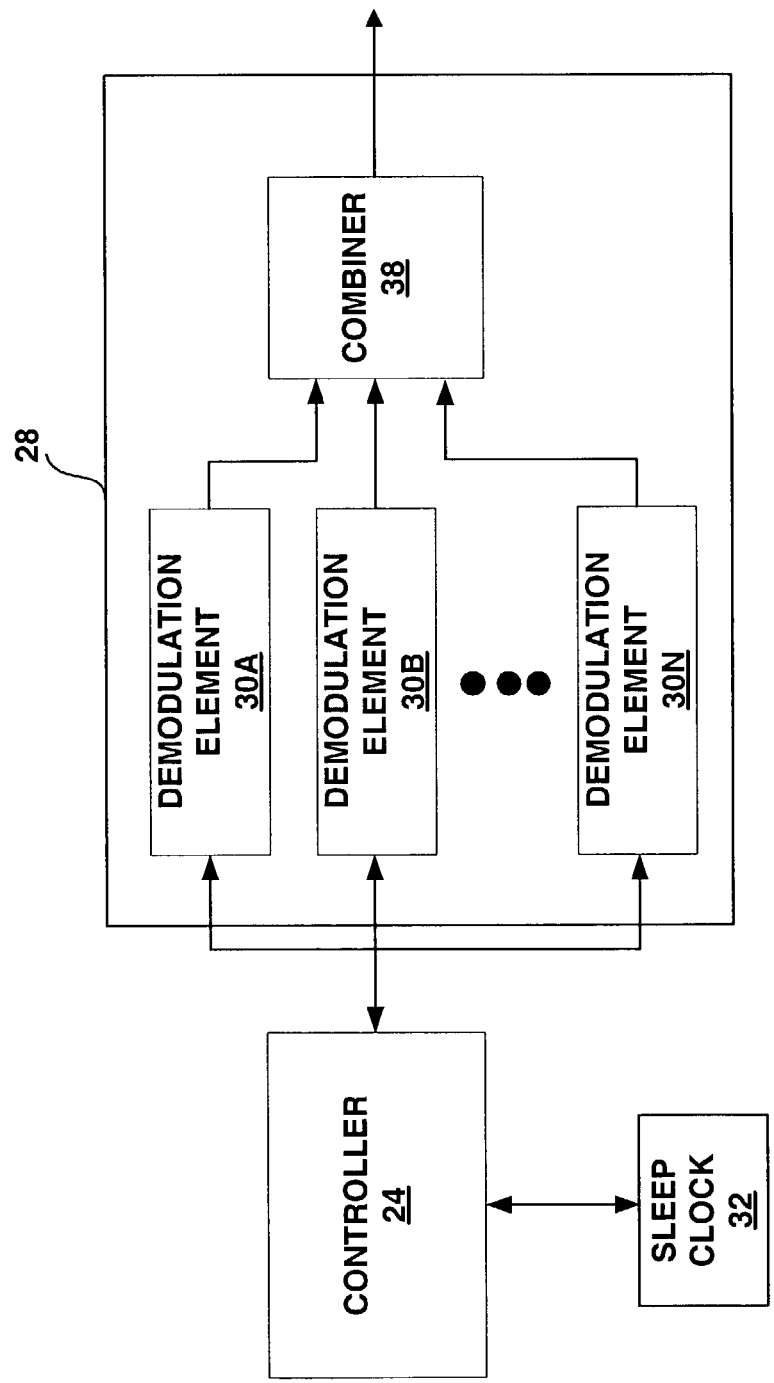
FIG. 3 is a block diagram illustrating exemplary RAKE receiver fingers of a demodulator within a wireless communication device.

WCD 16 can implement RAKE receiver fingers to track signals of a multi-path environment. For example, as illustrated in FIG. 3, demodulator 28 may include a number of demodulation elements 30 (referred to as fingers) to track multi-path signals. In that case, controller 24 uses the search results generated by search module 26 to assign demodulation elements 30 within demodulator 28. The demodulation elements 30 track and demodulate signals associated with one or more of the signal paths.

Referring again to FIG. 2, controller 24 can forward received chips to demodulator 28 for a process referred to as demodulation. Demodulation may involve despreading of pseudo-noise (PN) codes and decovering of orthogonal codes for each chip (sometimes referred to as "Walsh decovering"). The results of demodulation are then colleted and grouped into symbols. For example, each symbol may be generated from a stream of 256 demodulated chips. If WCD 16 implements a RAKE receiver configuration like that illustrated in FIG. 3, demodulation occurs in each demodulation element 30. In that case, the demodulated results from each path of the multi-path can be combined by combiner 38.

WCD 16 can be configured to operate according to slotted paging techniques. As mentioned above, in slotted paging, WCD 16 powers up to receive and demodulate paging signals. However, the paging signals are not transmitted to WCD 16 at all times. Rather, the paging signals are transmitted during temporally defined slots. Thus, during the time between the slots, WCD 16 can enter a sleep mode without missing the paging signals. During sleep mode, controller 24 may reduce or eliminate power consumption of various internal components of WCD 16, including for example, transmitter/receiver 20, search module 26, demodulator 28 and system clock 32.

At a time just before a paging signal is expected, controller 24 can cause the various internal components to power up so that the paging signal and other signals such as pilot signals can be received. For example, upon powering up, WCD may use pilot signals received over a pilot channel to estimate an error in sleep clock 32 in order to provide an open loop feedback adjustment as described in greater detail below. Then, after adjusting for the sleep clock error, the paging signal can be demodulated in order to determine whether WCD 16 is being paged for wireless communication. If so, WCD 16 can remain in an active state so that signals containing information, e.g., voice or data signals, can be transmitted to WCD 16. However, if the paging signal does not indicate that information is to be sent to WCD 16, controller 24 can cause WCD 16 to return to a sleep mode for a period of time.

During the sleep period, system clock 31 may be powered down along with a number of other internal components of WCD 16. In that case, sleep clock 32 can be used to track the amount of time that has elapsed. The process can continue for any number of slot cycles, with WCD 16 periodically entering awake mode to receive the paging signals and then returning to sleep mode if the paging signal does not indicate that information is to be sent to WCD 16.

The error associated with sleep clock 32 may be caused by frequency drift, or other frequency errors may occur in sleep clock 32 as a result of such things as temperature variations. Moreover, because the internal components of WCD 16 can generate heat, the frequency errors associated with sleep clock 32 may become relatively significant even over relatively short time periods. The error associated with sleep clock 32 is typically quantified in parts per million (PPM). As slot cycles become larger, the effective error per slot cycle of the sleep clock becomes larger even if the error in PPM remains the same.

Each time WCD 16 enters awake mode, the error associated with sleep clock 32 can be calculated to provide an open loop feedback adjustment. For example, the error associated with sleep clock can be measured for a slot cycle by comparing the expected time that a signal should be received (as defined by sleep clock 32) with the actual time it is received. In particular, WCD 16 may detect one or more unique words within the pilot signal or paging signal, such as a message preamble which signifies the beginning of the signal. The time that the unique word was received can then be compared with an expected time to measure the error of sleep clock 32. The measured error can then be used to adjust the amount sleep time (as defined by sleep clock 32) for the next sleep period, such as by adding an offset value to the sleep period.

WCD 16 typically remains in an awake mode for a window of time around the time that the paging signal is expected in order to ensure that paging signals can be received even if the frequency drift of sleep clock 32 causes the WCD 16 to awake slightly too early or slightly too late. However, if the PPM of sleep clock 32 is too large or if the length of the slot cycle is too large, problems can arise. Specifically, the error associated with sleep clock 32 can cause WCD 16 to awake at the wrong time, such that the paging signal is missed altogether. In that case, WCD 16 may need to remain in awake mode for a period of time covering the next full slot cycle in order to ensure that the next paging signal is not also missed, which results in additional power consumption.

One possible solution to this problem is to implement a higher frequency sleep clock within WCD 16, particularly if the slot cycle is defined to be relatively large. However, higher frequency sleep clocks may be more costly and typically use more power than lower frequency sleep clocks.

Another possible solution is to increase the size of the window of time that WCD 16 remains in awake mode by an amount sufficient to ensure that the paging signal will not be missed. However, as WCD 16 remains in awake mode for longer periods of time, more power is consumed. Moreover, the length of the slot cycle may change over time making it difficult to optimize the size of the window.

In accordance with one embodiment, WCD 16 is capable of periodically operating in intermediate wake mode for one or more intermediate periods of time within slot cycles. The ability to operate in intermediate wake mode may allow WCD 16 to utilize a lower power, lower frequency sleep clock, even if large slot cycles are defined. WCD 16 periodically operates in intermediate wake mode in order to estimate and account for errors in sleep clock 32. However, additional tasks, such as demodulation are avoided during the periods of time associated with intermediate wake mode.

Figure 4:
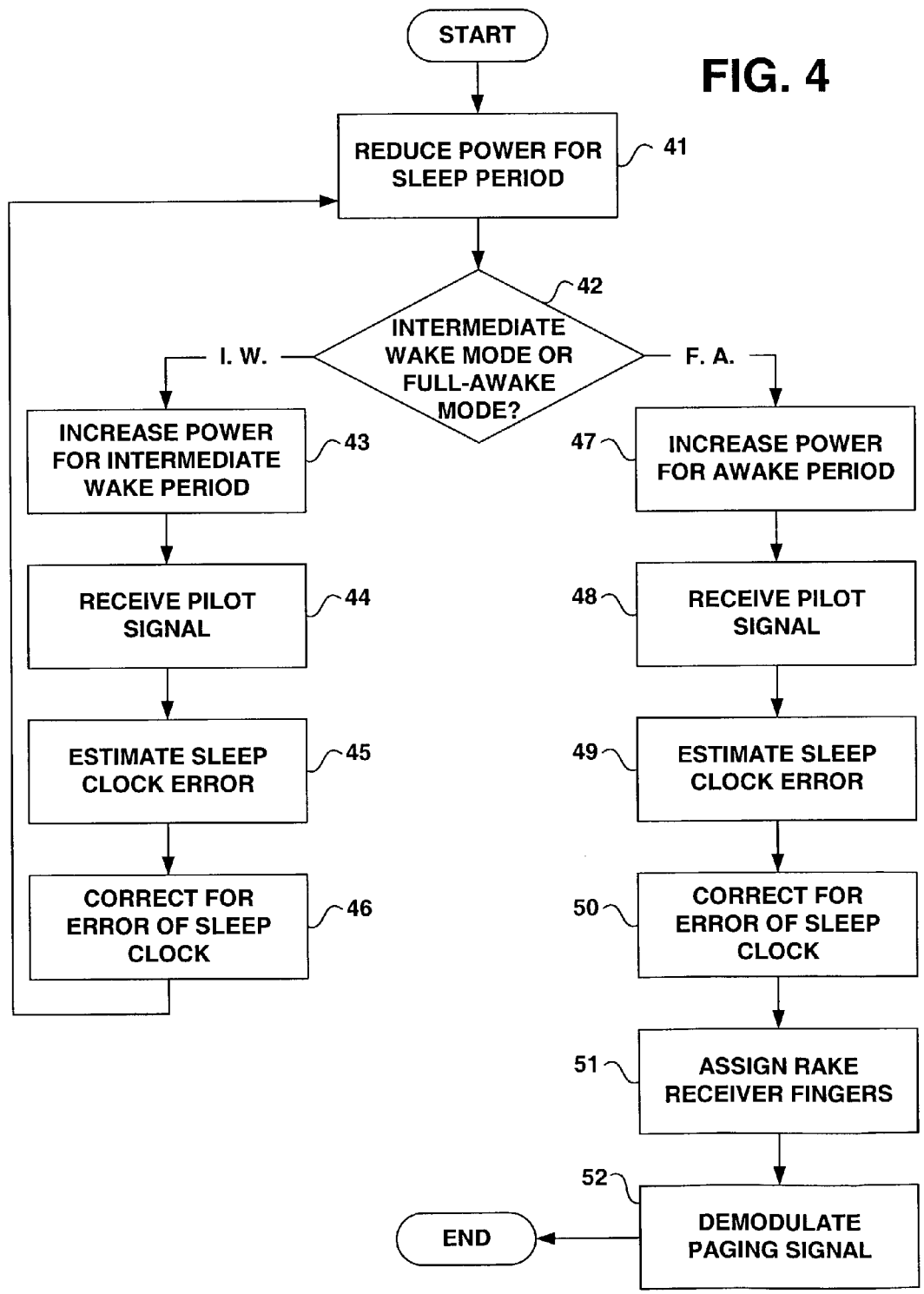
FIG. 4 is a flow diagram illustrating a technique implementing the concept of an intermediate wake mode within a wireless communication device.

FIG. 4 is a flow diagram according to one embodiment. In particular, FIG. 4 illustrates a process that can be implemented within controller 24 to control the mode of operation of WCD 16 over the course of a slot cycle. Over the course of the slot cycle, WCD 16 may operate in one or more of the following modes: sleep mode, awake mode, and intermediate wake mode. As shown, at the beginning of the slot cycle, controller 24 reduces power for a sleep period within WCD 16 (41). For example, controller 24 may cause various internal components to power down or otherwise enter a low power state. Sleep clock 32 remains powered during sleep mode, however, and provides a measure of the amount of time that has elapsed. Controller 24 may provide an adjustment to sleep clock 32 based on an error estimated for the previous slot cycle. After a defined length of time, controller 24 may cause some or all of the internal components of WCD 16 to be powered up. The specific components that are powered up and the length of time that they remain powered depends on whether WCD 16 enters an awake mode or an intermediate wake mode (illustrated by decision box 42).

If WCD 16 enters intermediate wake mode (42), controller 24 causes WCD to increase power for an intermediate awake period (43). In intermediate wake mode some, but not all of the internal components are powered up. For example, demodulator 28 may remain in a low power state for the intermediate period. WCD 16 can receive an incoming pilot signal (44), and reception of the pilot signal can be used to estimate the sleep clock error (45). For example, controller 24 can compare the expected time that the pilot signal should be received (as defined by sleep clock 32) with the actual time it is received. In particular, WCD 16 may define a window of time during which the pilot signal should be received. The time that the pilot signal is expected may be defined by a pseudo-noise (PN) offset value associated with the base station sending the signal. WCD 16 may store the PN offset value prior to entering sleep mode. Then, when WCD 16 enters intermediate wake mode, it can use the stored PN offset to define the expected time for the pilot signal. The time that the pilot signal is actually received can be compared with an expected time to measure the error of sleep clock 32.

Controller 24 can then correct for the error in sleep clock 32 for the next sleep period (46), such as by implementing a feedback loop. In other words, the measured error can be used to adjust the timing for the subsequent sleep period, such as by adding an offset to the sleep period defined by sleep clock 32. After controller 24 has corrected for the error in the sleep clock, it can cause WCD to reenter sleep mode, i.e., reduce power of a second sleep period for that slot cycle (41). In other words, during intermediate wake mode, WCD 16 does not perform demodulation. For at least this reason, intermediate wake mode may consume significantly less power than full-awake mode.

WCD 16 may implement any number of intermediate wake periods over the course of a slot cycle. In this manner, errors associated with sleep clock 32 can be accounted for, even if the slot cycle is very large. Eventually, WCD 16 enters full-awake mode (42). In that case, controller 24 causes WCD 16 to increase power for an awake period (47). In awake mode, substantially all of the internal components are powered up, including demodulator 28.

During awake mode, WCD 16 may perform all of the tasks performed during intermediate wake mode, such as receiving a pilot signal (48), estimating the sleep clock error (49), and correcting for the error in the sleep clock (50), for example, by implementing a feedback loop to compensate timing of the next sleep period. In addition, during awake mode, WCD 16 performs additional tasks not performed during intermediate wake mode. In particular, during awake mode, WCD 16 performs demodulation of the paging signal. For example, control unit 24 may assign RAKE receiver fingers (51) which can demodulate the paging signal (52), such as by despreading of pseudo-noise (PN) codes and Walsh decovering of orthogonal codes. The demodulated symbols can then be interpreted in order to determine the content of the paging signal.

If the content of the paging signal indicates that information is to be sent to WCD 16, WCD 16 can remain in awake mode to receive the information. However, if the content of the paging signal indicates that no information is to be sent to WCD 16, controller 24 can cause WCD 16 to enter a sleep period for the next slot cycle.

Again, by operating in intermediate awake mode during one or more intermediate wake periods over a course of a slot cycle, sufficient accounting of the error associated with sleep clock 32 can be achieved, even if a very low power, low frequency sleep clock is implemented, and even if large slot cycles are defined. The number of intermediate wake periods implemented over the course of a slot cycle may depend on both the accuracy of the sleep clock and the length of the slot cycle. In most cases, intermediate wake mode should be invoked often enough to account for the sleep clock error and thereby ensure that the paging signal can be received during the window of time allocated for the reception of the paging signal.

In some cases, WCD 16 may dynamically control the number of intermediate wake periods based on the length of the slot cycle. For example, WCD 16 may implement what is referred to as a telescoping algorithm to adjust the length of the slot cycle over the course of operation in the slotted paging system. In one example, the length of the slot cycle is defined by a slot cycle index (SCI). For example the length of the slot cycle may be approximately:

$1.28*2^{(SCI)}$ seconds

Thus, if SCI=0, then the length of the slot cycle is approximately 1.28 seconds, and if SCI is 1, then the length of the slot cycle is approximately 2.56 seconds. If SCI is 2, then the length of the slot cycle is approximately 5.12 seconds, and so forth.

WCD 16 may implement a telescoping algorithm to dynamically control the length of the slot cycle. The telescoping algorithm may operate within control unit 24 to adjust the SCI over the course of time in order to improve performance of WCD 16. For example, in one embodiment, the telescoping algorithm begins with SCI=0 and then increments the SCI for subsequent slot cycles when appropriate. The effect of the algorithm generally causes the length of the slot cycle to increase over time, when appropriate. In particular, the telescoping algorithm may cause the slot cycle index to be incremented only after the error in the sleep clock has settled to a relatively steady state. The telescoping algorithm may cause WCD 16 to sleep for longer and longer periods of time, after determining that appropriate account of errors in the sleep clock are made. At some point, the telescoping algorithm should reach a desired slot cycle, at which point increments to the slot cycle index may cease. The desired slot cycle index may be programmed into WCD 16 and base station 12. In other words, the telescoping algorithm can provide an acceptable way to reach the desired slot cycle index in a step-wise fashion, while accounting for possible errors in the sleep clock.

In accordance with one embodiment, control unit 24 may also dynamically adjust the number of intermediate wake periods based on the adjusted length of the slot cycle, as dynamically defined by the telescoping algorithm. For example, if a low accuracy sleep clock is used, it may be desirable to adjust for errors in the sleep clock approximately every 1.28 seconds, regardless of the defined length of the slot cycle. In that case, if the telescoping algorithm establishes a SCI=0, then no intermediate wake periods are necessary over that slot cycle. However, if SCI is adjusted to SCI=1, control unit 24 may invoke an intermediate wake mode for one intermediate period of that slot cycle. Similarly, if SCI is adjusted to SCI=2, control unit 24 may invoke intermediate wake mode for three different periods of that slot cycle. In this manner, it can be ensured that the errors in the sleep clock are adjusted approximately every 1.28 seconds, regardless of the defined length of the slot cycle. This can ensure that the errors associated with the sleep clock are adequately accounted for, regardless of the length of the slot cycle.

Various embodiments have been described. For example, an intermediate wake mode of operation of a wireless communication device has been described. As outlined above, implementing intermediate wake mode can improve performance of a wireless communication device, particularly when used in a slotted paging system. Nevertheless, modifications can be made without departing from the sprit and scope of this disclosure. For example, additional frequency error estimation techniques may be implemented to improve estimation of the frequency error of the sleep clock. In one example, early re-activation of system clock 31 following a sleep mode may provide a measurement of the actual frequency of sleep clock 32 to improve error estimation. These and other embodiments are within the scope of the following claims.

What is claimed is:

1. A method comprising:
   reducing power in a wireless communication device to place the wireless communication device in a sleep mode for a first sleep period;
   increasing power in the wireless communication device to place the wireless communication device in an intermediate wake made for an intermediate wake period after the first sleep period, the intermediate wake mode being a mode in which the wireless communication device is not fully powered and not demodulating a paging channel but is estimating an error of a sleep clock; and
   reducing power in the wireless communication device for a second sleep period to place the wireless communication device in the sleep mode immediately after the intermediate wake period so that the paging channel is not demodulated by the wireless communication device between the first sleep period and the second sleep period.

2. The method of claim 1, further comprising increasing power in the wireless communication device for an awake period after the second sleep period.

3. The method of claim 2, further comprising during the awake period:
   estimating the error of the sleep clock based on a time that a pilot signal is received;
   correcting for the error in the sleep clock; and
   demodulating a paging signal.

4. The method of claim 1, wherein the intermediate wake period is a first intermediate wake period, the method further comprising increasing power in the wireless communication device for a second intermediate wake period after the second sleep period to estimate another error of the sleep clock without performing a demodulation.

5. The method of claim 1, further comprising during the intermediate wake period:
   estimating the error of the sleep clock based on a time that a pilot signal is received; and
   correcting for the error in the sleep clock.

6. The method of claim 1, further comprising dynamically defining a length of a slot cycle and adjusting a number of intermediate wake periods to occur in a slot cycle based on the length of the slot cycle.

7. A computer-readable medium comprising program code that when executed:
   reduces power in a wireless communication device to place the wireless communication device in a sleep mode for a first sleep period;
   increases power in the wireless communication device to place the wireless communication device in an intermediate wake mode for an intermediate wake period after the first sleep period, the intermediate wake mode being a mode in which the wireless communication device is not fully powered and not demodulating a paging channel but is estimating an error of a sleep clock; and reduces power in the wireless communication device for a second sleep period to place the wireless communication device in the sleep mode immediately after the intermediate wake period so that the paging channel is not demodulated by the wireless communication device between the first sleep period and the second sleep period.

8. The computer-readable medium of claim 7, wherein the program code when executed increases power in the wireless communication device for an awake period after the second sleep period.

9. The computer-readable medium of claim 8, wherein the program code when executed during the awake period:
   estimates the error of the sleep clock based on a time that a paging signal is received;
   corrects for the error in the sleep clock; and
   causes a paging signal to be demodulated.

10. The computer-readable medium of claim 7, wherein the intermediate wake period is a first intermediate wake period, wherein the program code when executed increases power in the wireless communication device for a second intermediate wake period after the second sleep period to estimate another error of the sleep clock without performing a demodulation.

11. The computer-readable medium of claim 7, wherein the program code when executed during the intermediate wake period:
   estimates the error of the sleep clock based on a time that a pilot signal is received; and
   corrects for the error in the sleep clock.

12. The computer-readable medium of claim 7, wherein the program code when executed dynamically defines a length of a slot cycle and adjusts a number of intermediate wake periods to occur in a slot cycle based on the length of the slot cycle.

13. A controller for use in a wireless communication device having a sleep clock, the controller comprising:
   means for reducing power in the wireless communication device to place the wireless communication device in a sleep mode for a first sleep period;
   means for increasing power in the wireless communication device to place the wireless communication device in an intermediate wake mode for an intermediate wake period after the first sleep period, the intermediate wake mode being a mode in which the wireless communication device is not fully powered and not demodulating a paging channel but is estimating an error of a sleep clock; and
   means for reducing power in the wireless communication device for a second sleep period to place the wireless communication device in the sleep mode immediately after the intermediate wake period so that the paging channel is not demodulated by the wireless communication device between the first sleep period and the second period.

14. The controller of claim 13, wherein the controller increases power in the wireless communication device for an awake period after the second sleep period.

15. The controller of claim 14, wherein during the awake period the wireless communication device receives a pilot signal and a paging signal; and
   the controller estimates the error in the sleep clock, corrects for the error in the sleep clock, and causes the paging signal to be demodulated.

16. The controller of claim 15, wherein the controller causes the paging signal to be demodulated by assigning RAKE receiver fingers to demodulate the paging signal.

17. The controller of claim 13, wherein the intermediate wake period is a first intermediate wake period, wherein the controller increases power in the wireless communication device for a second intermediate wake period after the second sleep period to estimate another error of the sleep clock without performing a demodulation.

18. The controller of claim 13, wherein during the intermediate wake period the wireless communication device receives a pilot signal; and
   the controller estimates the error in the sleep clock and corrects for the error in the sleep clock.

19. The controller of claim 13, wherein the controller dynamically defines a length of a slot cycle, and adjusts a number of intermediate wake periods to occur in a slot cycle based on the length of the slot cycle.

20. An apparatus comprising:
   a memory that stores executable instructions; and
   a processor coupled to the memory that executes the instructions to reduce power in a wireless communication device so as to place the wireless communication device in a sleep mode for a first sleep period, increase power in the wireless communication device so as to place the wireless communication device in an intermediate wake mode for an intermediate wake period after the first sleep period, the intermediate wake mode being a mode in which the wireless communication device is not fully powered and not demodulating a paging channel but is estimating an error of a sleep clock, and reduce power in the wireless communication device for a second sleep period to place the wireless communication device in the sleep mode immediately after the intermediate wake period so that the paging channel is not demodulated by the wireless communication device between the first sleep period and the second sleep period.

21. The apparatus of claim 20, wherein the processor executes the instructions to dynamically define a length of a slot cycle and adjust a number of intermediate wake periods to occur in a slot cycle based on the length of the slot cycle.

22. The apparatus of claim 20, wherein the processor executes the instructions to increase power in the wireless communication device for an awake period after the second sleep period.

23. The apparatus of claim 20, wherein the intermediate wake period is a first intermediate wake period, wherein the processor executes the instructions to increase power in the wireless communication device for a second intermediate wake period after the second sleep period to estimate another error in the sleep clock without performing a demodulation.

24. An apparatus comprising:
   means for reducing power in the wireless communication device to place the wireless communication device in a sleep mode for a first sleep period;
   means for increasing power in the wireless communication device to place the wireless communication device in an intermediate wake mode for an intermediate wake period after the first sleep period, the intermediate wake mode being a mode in which the wireless communication device is not fully powered and not demodulating a paging channel but is estimating an error of a sleep clock; and
   means for reducing power in the wireless communication device for a second sleep period to place the wireless communication device in the sleep mode immediately after the intermediate wake period so that the paging channel is not demodulated by the wireless communication device between the first sleep period and the second period.

25. The apparatus of claim 24, further comprising means for increasing power in the wireless communication device for an awake period after the second sleep period.

26. The apparatus of claim 25, further comprising:
means for receiving a pilot signal during the awake period;
means for estimating the error in the sleep clock during the awake period;
means for correcting for the error in the sleep clock; and
means for demodulating a paging signal during the awake period.

27. The apparatus of claim 24, wherein the intermediate wake period is a first intermediate wake period, the apparatus further comprising means for increasing power in the wireless communication device for a second intermediate wake period after the second sleep period to estimate another error in the sleep clock without performing a demodulation.

28. The apparatus of claim 24, further comprising:
means for receiving a pilot signal during the intermediate wake period;
means for estimating the error in the sleep clock during the intermediate wake period; and
means for correcting for the error in the sleep clock.

29. The apparatus of claim 24, further comprising means for dynamically defining a length of a slot cycle and adjusting a number of intermediate wake periods to occur in a slot cycle based on the length of the slot cycle.

* * * * *